(12) United States Patent
Mrozek et al.

(10) Patent No.: US 10,494,485 B2
(45) Date of Patent: Dec. 3, 2019

(54) BRANCHED ADDITIVES FOR POLYMER TOUGHENING

(71) Applicant: THE UNITED STATES GOVERNMENT AS REPRESENTED BY THE SECRETARY OF THE ARMY, Washington, DC (US)

(72) Inventors: Randy A. Mrozek, Port Deposit, MD (US); Joseph L. Lenhart, Port Deposit, MD (US); Robert H. Lambeth, Elkton, MD (US); Jan W. Andzelm, North East, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 330 days.

(21) Appl. No.: 14/936,190

(22) Filed: Nov. 9, 2015

(65) Prior Publication Data

US 2016/0200878 A1  Jul. 14, 2016

Related U.S. Application Data

(62) Division of application No. 13/891,477, filed on May 10, 2013, now Pat. No. 9,181,432.

(60) Provisional application No. 61/645,286, filed on May 10, 2012.

(51) Int. Cl.
| | |
|---|---|
| *C08L 83/04* | (2006.01) |
| *C08G 77/44* | (2006.01) |
| *C08F 287/00* | (2006.01) |
| *C08F 299/00* | (2006.01) |

(52) U.S. Cl.
CPC ............ *C08G 77/44* (2013.01); *C08F 287/00* (2013.01); *C08F 299/00* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 5,910,530 A | 6/1999 | Wang et al. | |
| 6,084,030 A | 7/2000 | Janssen et al. | |
| 6,093,777 A * | 7/2000 | Sorensen | B44C 5/0469 |
| | | | 525/167.5 |
| 6,153,691 A | 11/2000 | Gornowicz et al. | |
| 6,384,134 B1 | 5/2002 | Hall et al. | |
| 2006/0173145 A1 | 8/2006 | Pawlow et al. | |
| 2010/0137520 A1 * | 6/2010 | Robertson | B60C 1/00 |
| | | | 525/236 |

FOREIGN PATENT DOCUMENTS

WO  WO201245006 A1  4/2012

OTHER PUBLICATIONS

Dendrimers, Sigma-Aldrich, Aug. 2003. (Year: 2003).*
Viers, et al., Hydrogels formed by Endlinking PEG to Dendrimer Crosslink Agents, Polymer Preprints 41, (1), 728, Mar. 2000. (Year: 2000).*
Treloar L. R.G., The Physics of Rubber Elasticity, Oxford University Press, Chapter 1, p. 12 2005. (Year: 2005).*
Sperling, Chaper 1 Sound and Vibration Damping with Polymers, pp. 6-8, ACS Symposium Series, Apr. 1989.
Perkin Elmer Introduction to DMA Dec. 2008.
Army Research Laboratory Technical Report ARL-TR-6338 titled "Branched Polymers for Enhancing Polymer Gel Strength and Toughness (Final Report)" by Robert H. Lambeth et al. Feb. 2013.
Hegewald, J., Pionteck, J., Häußler, L., Komber, H. & Voit, B. End-functionalized polystyrene by ATRP: A facile approach to primary amino and carboxylic acid terminal groups. Journal of Polymer Science Part A: Polymer Chemistry 47, 3845-3859, doi:10.1002/pola.23451 (2009).
Pourjavadi, A. et al. Use of a novel initiator for synthesis of amino-end functionalized polystyrene (NH2-PS) by atom transfer radical polymerization. J Polym Res 19, 1-8, doi:10.1007/s10965-011-9752-x (2011).
Hu, G. H. & Lindt, J. T. Amidification of poly(styrene-co-maleic anhydride) with amines in tetrahydrofuran solution: A kinetic study. Polymer Bulletin 29, 357-363, doi:10.1007/bf00944831 (1992).
Babu, R. P. & Dhamodharan, R. Reversible addition-fragmentation chain transfer RAFT polymerization of styrene using novel heterocycle-containing chain transfer agents. Polymer International 57, 365-371 (2008).
Moad, G. et al. Living free radical polymerization with reversible addition—fragmentation chain transfer (the life of RAFT). Polymer International 49, 993-1001, doi:10.1002/1097-0126(200009)49:9<993::aid-pi506>3.0.co;2-6 (2000).
Chow, D.; Nunalee, M. L.; Lim, D. W.; Simnick, A. J.; Chilkoti, A. Materials Science and Engineering: R: Reports 2008, 62, 125.
Dusek K. Responsive Gels: vol. Phase Transitions, Advances in Polymer Science; Berlin: Springer, 1993.
Beebe, D. J.; Moore, J. S. Nature 2000, 404, 588.
Liu, R. H.; Qing, Y.; Beebe, D. J. Journal of Microelectromechanical Systems 2002, 11, 45-53.
Otake, M.; Kagami, Y.; Kuniyoshi, Y.; Inaba, M. A.; Inoue, H. A. IEEE Int. Conf. Robot Autom. 2002, 3, 3224-3229.
Hu, Z.; Chen, Y.; Wang, C.; Zheng, Y.; Li, Y. Nature 1998, 393, 149.
Holt, J. H.; Asher, S. A. Nature 1997, 389, 829.
Lenhart, J. L.; Cole, P. J.; Unal, B.; Hedden R. Appl. Phys. Lett. 2007, 91, 061929-061923.

(Continued)

*Primary Examiner* — Christopher M Rodd
(74) *Attorney, Agent, or Firm* — Christos S. Kyriakou

(57) ABSTRACT

Toughened polymeric materials and methods of forming toughened polymeric materials are provided herein. In some embodiments, a method of forming toughened polymeric materials may include preparing a branched polymeric additive; mixing the branched polymeric additive with a polymer to form a polymeric mixture, wherein the branched polymeric molecule either mixes and/or bonds with the polymer to reduce mobility in the polymer; and curing the polymeric mixture. In some embodiments, a toughened polymeric material comprises a polymer network; and a branched polymeric molecule bonded to the polymer network.

12 Claims, 7 Drawing Sheets

(56) References Cited

OTHER PUBLICATIONS

Kwon, I. C.; Bae, Y. H.; Kim, S. W. Nature 1991, 354, 291-293.
Miyata, T.; Asami, N.; Uragami, T. Nature 1999, 399, 766-769.
Park, T. G. Biomaterials 1999, 20, 517-521.
Schmaljohann, D.; Oswald, J.; Jorgensen, B.; Nitschke, M.; Beyerlein, D.; Werner, C. Biomacromolecules 2003, 4, 1733-1739.
Elaïssari, A.; Rodrigue, M.; Meunier, F.; Herve, C. J. Magn. Mater. 2001, 225, 127-133.
Calvert, P. Adv. Mater. 2009, 21, 743-756.
Mrozek, R. A.; Cole, P. J.; Cole, S. M.; Schroeder, J. L.; Schneider, D. A.; Hedden, R. C.; Lenhart, J. L. J. Mater. Res. 2010, 25, 1105-1117.
Laurer, J. H.; Bukovnik, R.; Spontak, R. J. Macromolecules 1996, 29, 5760-5762.
Tanaka, T. Phys. Rev. Lett. 1978, 40, 820.
Twieg, R. J.; Russell, T. P.; Siemens, R.; Rabolt, J. F. Macromolecules 1985, 18, 1361-1362.
Gent, A. N.; Liu, G. L.; Mazurek, M. Journal of Polymer Science, Part B: Polymer Physics 1994, 32, 271-279.
Fetters, L. J.; Kiss, A. D.; Pearson, D. S.; Quack, G. F.; Vitus, F. J. Macromolecules 1993, 26, 647.
Hammouch, S. O.; Beinert, G. J.; Herz, J. E. Polymer 1996, 37, 3353.
Lohmeijer, B.G.G.; Dubois, G.; Leibfarth, F.; Pratt, R. C.; Nederberg, F.; Nelson, A.; Waymouth, R. M.; Wade, C.; Hedrick, J. L. Organic Letters 2006, 8, 4683.
Zilliox, J. G.; Roovers, J.E.L.; Bywater, S. Macromolecules 1975, 8, 573.
Hammouch, S. O.; Beinert, G. J.; Zilliox, J. G.; Herz, J. E. Polymer 1995, 36, 421.
Seitz. M. E ; Martina. D.; Baumberger, T.; Krishnan, V. R. ; Hui, C.-Y.; Shull, K. R. Soft Matter 2009, 5, 447.
Baumberger, T; Caroli, C.; Martina, D European Physical Journal E: Soft Matter 2006, 21, 81 .
Baumberger, T.; Caroli, C. ; Martina, D. Nature Materials 2006, 5, 552.
Moloney. A.: Kausch, H., Kaiser, T.; Beer, H. Journal of Materials Science 1987, 22, 381.
Guo, Z.; Pereira, T.; Choi, 0 .; Wang, Y.; Hahn, H. T. J. Mater. Chem. 2005, 16, 2800.
Lee, J . Y.; Buxton, G. A.; Balazs, A. C. The Journal of Chemical Physics 2004, 121, 5531.
Lee, J.-Y.; Zhang, Q; Wang, J.-Y.; Emnck, T.; Crosby, A. J. Macromolecules 2007, 40, 6406.
Gupta, S.; Zhang, Q.; Emr;ck, T., Balazs, A. C.; RL:ssell, T. P. Nature Materials 2006. 5, 229.
Mackay, M. E.; Tuteja, A.; Duxbury, P. M.; Hawi<er, C. J.; Van Horn, B.; Guan, Z.; Chen, G.; Krisman. R. S. Science 2006, 311 , 1740.
Fukushima, J. ; Yasuda. K.; Teratani, H.; Nishizaki, S. J. Appl. Polym. Sci. 1978, 22, 1701.
Kinloch, A. J.; Shaw. S. J.; Tod, D. A.; Hunston , D. L. Polymer 1983. 24, 1341.
Mezzenga. R.; Manson, J. A. E. Journal of Materials Science 2001, 36, 4883.
Norman, R. H. Conductive Rubber and Plastics, Elsevier: Lndon, 1970.
Gong. . P.: Katsuyama , Y.; Kurokawa, T.; Osada, Y. Adv. Mater. 2003, 15, 1155.
Huang, M.; Furukawa, H.; Tanaka, Y.; NakaJima, T.; Osada, Y.; Gong, J. P. Macromolecules 2007, 40. 6658.
Tirumala, V. R.; Tominaga, T.; Lee, S.; Butler, P. D.; Lin.. E. K.; Gong. J P .; Wu, W.-I, The Journal of Physical Chemistry B 2008, 112, 8024.
Dendrimers—Sigma Aldrich, Aug. 2003.
Viers et al. (Hydrogels Formed by Endlinking PEG to Dendrimer Crosslink Agents, Polymer Preprints 41 (1 ), 728 Mar. 2000).
Hadjichristidis et al. (Anionic Polymerization: High Vaccuum Techniques, Journal of Polymer Science Part A Polymer Chemistry, 38, 3211-3234 (2000)).
Treloar L. R.G. (The Physics of Rubber Elasticity, Oxford University Press, Chapter 1, p. 12 2005).
Mrozek, Randy et al. "Design of nonaqueous polymer gels with broad temperature performance: Impact of solvent quality and processing conditions" J. Mater. Res., vol. 25, No. 6 Jun. 2010.
Chantawansri et al. "Phase Behavior of SEBS Triblock Copolymer Gels" Journal of Polymer Science Part B: Polymer Physics 2011, 49, 1479-1491.
Mrozek et al. "Impact of precursor size on the chain structure and mechanical properties of solvent-swollen epoxy gels" Soft Matter, 2012, 8, 11185.
Lenhart et al. "Adhesion Properties of Lightly Crosslinked Solvent-Swollen Polymer Gels" The Journal of Adhesion, 82:945-971, 2006.

* cited by examiner

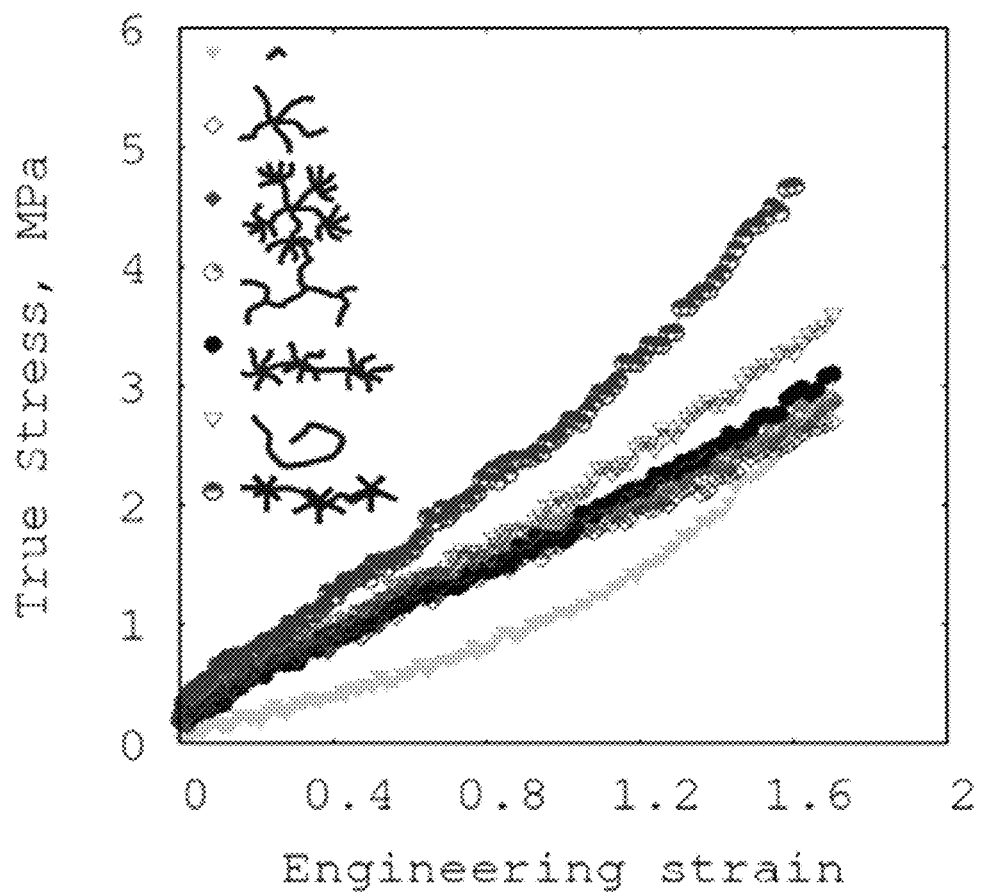
FIG. 7 Computational modeling of the impact of solvent size and architecture on the stress-strain behavior of a polymer network.

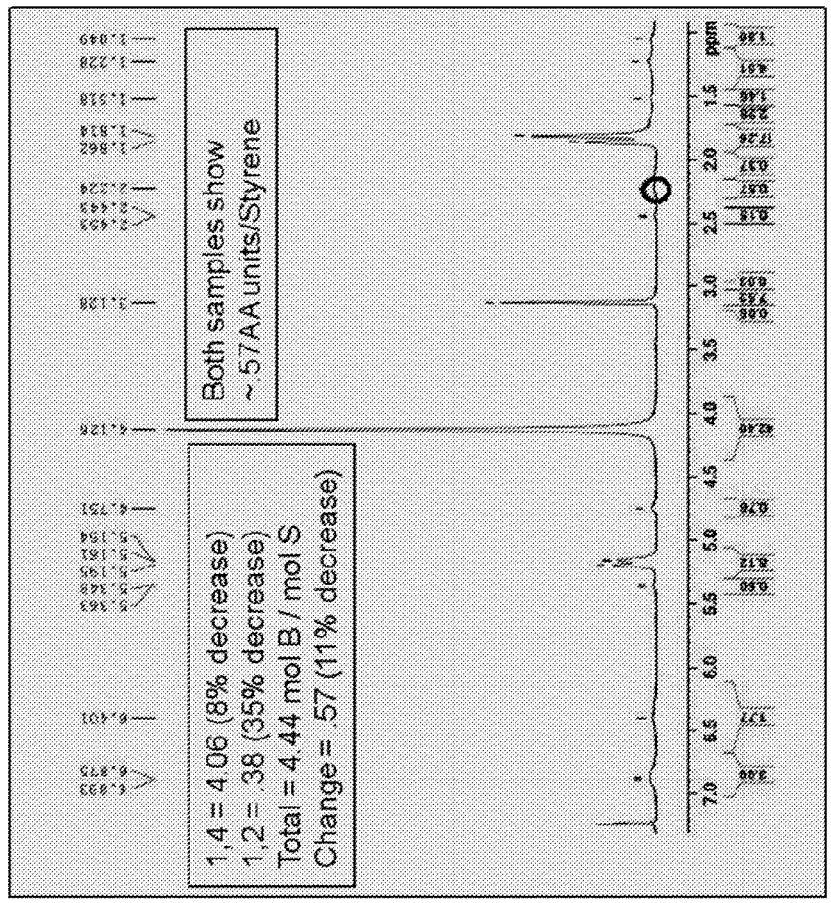
FIG. 8 NMR analysis of specturm of the final product demostrating successful grafting of poly(acrylic acid) on the polybutadiene portion of SBS.

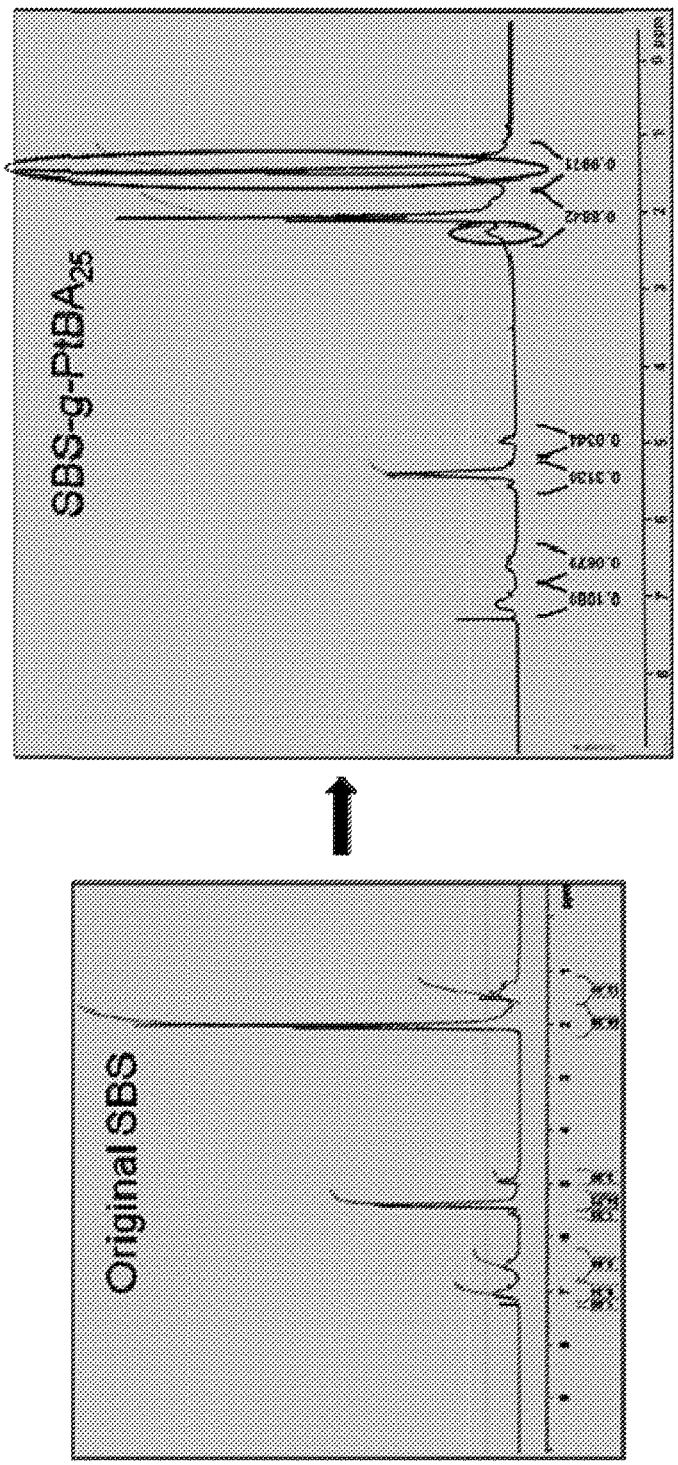
FIG. 9 NMR spectra of SBS and poly(tert-butyl acrylate) grafted SBS demonstrating changes to the NMR spectra supporting grafting of the poly(tert-butyl acrylate) on the polybutadiene portion of SBS.

BRANCHED ADDITIVES FOR POLYMER TOUGHENING

CROSS-REFERENCE TO RELATED APPLICATIONS

This patent application is a divisional of U.S. patent application Ser. No. 13/891,477 filed May 10, 2013, entitled, "Nanocellulose Foam Containing Active Ingredients" that claims the benefit of U.S. Provisional Patent Application No. 61/645,286 titled "Branched Additives for Polymer Toughening and Polymer Networks Containing the Same" filed on May 10, 2012 the entire contents which are hereby incorporated by reference herein including all attachments and other documents that were incorporated by reference in U.S. Provisional Patent Application No. 61/645,286. Both U.S. patent application Ser. No. 13/891,477 and U.S. Provisional Patent Application No. 61/645,286 are hereby incorporated by reference herein in their entireties.

GOVERNMENT INTEREST

Governmental Interest—The invention described herein may be manufactured, used and licensed by or for the U.S. Government.

FIELD OF INVENTION

Embodiments of the present invention generally relate to polymeric materials and, more particularly, to toughened polymeric materials and methods of forming toughened polymeric materials

BACKGROUND OF THE INVENTION

Enhanced toughening of polymeric materials has been a topic of intense research for several decades. Most of the historic effort on toughening polymers has focused on rigid materials. Specifically, on the incorporation of additives or fillers to a polymeric formulation in an effort to develop an approach that is generally applicable to multiple materials at a low cost. The impact of the filler depends on the filler size, shape, loading, and dispersion. The impact of the added filler can be enhanced by functionalizing the filler particle to interact more strongly with the host polymer network. However, it is difficult to obtain an intimate dispersion of the filler particulate in the polymer necessary to optimize the toughening. This difficulty becomes even more pronounced as the filler size is decreased into the nanoscale regime. In addition, these polymeric materials toughened by the addition of filler cannot be implemented into applications that require reduced thicknesses on the order of the filler particle size or, more practically, several times larger than the filler particle size. In addition, the filler particulate is often more dense that the polymer, which can lead to particle settling during cure, thereby leading to non-uniform material properties. Toughening has also been explored in rigid materials through the inclusion of rubbery domains. The rubbery domains are the result of the incorporation of rubber particulate or the phase separation of a rubbery additive to alter fracture mechanics and produce higher toughness. A similar mechanism is attributed for improvements in toughness through the incorporation of hyperbranched polymers that also phase separate from the host polymer. Rubber toughening through phase separation requires a balance of solubilities, polymer processing kinetics, and phase separation kinetics to obtain rubbery domains dispersed throughout the material without producing phase separation. To mitigate solubility and kinetic issues, pre-fabricated rubber particulates can be added into the host polymer but they will exhibit the same drawbacks related to particle incorporation discussed previously.

Transitioning the toughening mechanisms developed for rigid polymers to soft polymeric materials is difficult due to changes in the fracture mechanism and the energy associated with the crack propagation. The incorporation of fillers has been shown to enhance the mechanical properties of soft polymeric materials however the same disadvantages identified in rigid materials are still present. In addition, the incorporation of filler can lead to undesired decreases in the elasticity and elongation at break.

A method utilized to enhance soft polymeric material toughness is to produce a dual polymer network in a swollen polymer gel. While successful, these gels are typically produced through a complicated sequence of reaction conditions. Initially, a relatively rigid, high cross-link density network is formed and then swollen with a solvent to allow for infiltration by a secondary network precursor. The secondary component is then polymerized to produce a second and more flexible low cross-link density network within the more rigid system. The two independent networks are entangled to provide a novel toughening mechanism. As the dual network gel is deformed, the rigid network is fractured but is held together by the more flexible network. While these dual networks enhance the gel strength and toughness, it is not easily scaled or transitioned to other gel systems. Specifically, this toughening mechanism has only been reported for hydrogel systems that utilize water as a solvent. The water-based hydrogels have limited applicability due to the relatively high volatility of water leading to evaporation and a change in the material properties. In addition, the freezing and boiling points, respectively, fall within the operational temperature of many applications and will have a large impact on the material performance.

Therefore, the inventors have provided improved toughened polymeric materials and methods of forming toughened polymeric materials.

BRIEF SUMMARY OF THE INVENTION

Embodiments of the present invention relate to toughened polymeric materials and methods of forming toughened polymeric materials. In some embodiments, a method of forming toughened polymeric materials may include preparing a branched polymeric additive; mixing the branched polymeric additive with a polymer to form a polymeric mixture, wherein the branched polymeric molecule either mixes and/or bonds with the polymer to reduce mobility in the polymer; and curing the polymeric mixture.

In some embodiments, a toughened polymeric material comprises a polymer network; and a branched polymeric molecule bonded to the polymer network.

Other and further embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not

FIG. 7 provides results of computational modeling of the impact of solvent size and architecture on the stress-strain behavior of a polymer network FIG. 8 provides NMR analysis of spectrum of the final product demonstrating successful grafting of poly(acrylic acid) on the polybutadiene portion of SBS FIG. 9 provides NMR spectra of SBS and the poly(tert-butyl acrylate) grafted SBS demonstrating changes to the NMR spectra supporting grafting of the poly(tert-butyl acrylate) on the polybutadiene portion of SBS

DETAILED DESCRIPTION OF THE INVENTION

Embodiments of the present invention include toughened polymeric materials and methods of forming toughened polymeric materials. Toughened polymeric materials and methods of forming toughened polymeric materials may include the incorporation of a branched polymeric additive into a polymer network. Embodiments of the present invention may advantageously result in reduced mobility in the polymer network as compared to a linear molecule of the same molecular weight. As a result when the polymeric material is deformed at a rate faster that the mobility time of the branched polymeric additive, the additive cannot migrate away from the deformation zone. Thus, deformations faster than the characteristic mobility time of the branched polymeric additive will result in an increase in the modulus, strength, and toughness of the polymer network, enabling tenability of the strain rate dependent mechanical response. During deformation as the result of a fracture event, the branched polymeric additive will enhance the toughness of the material through one or more of several mechanisms; a) the decreased mobility of the additive will act as additional chemical cross-linking requiring a larger number of covalent bonds to be broken to facilitate further fracture propagation; b) the inability of the additive to migrate away from the crack tip will produce a larger zone of plastic deformation requiring additional energy to maintain crack propagation and c) the larger plastic deformation zone will produce greater energy dissipation to limit crack propagation. The increased energy required to initiate, propagate, and maintain crack growth due to these mechanisms will lead to enhanced fracture toughness of the polymer network.

Figure 1:
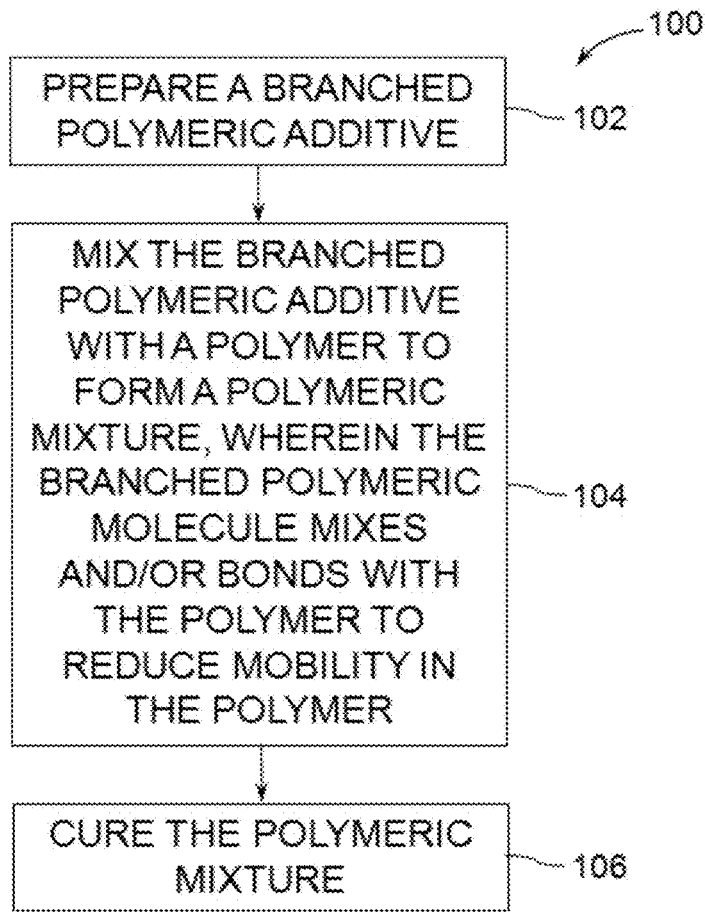
FIG. 1 depicts a flow diagram of a method of forming toughened polymeric materials in accordance with some embodiments of the present invention.

FIG. 1 depicts a flow diagram of a method 100 of forming toughened polymeric materials in accordance with some embodiments of the present invention.

Figure 2:
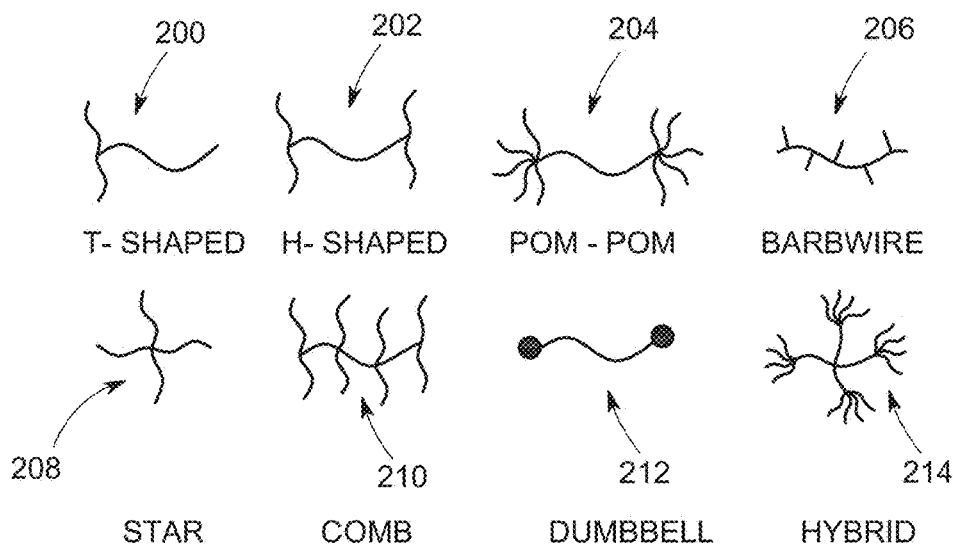
FIG. 2 depicts exemplary branched polymeric additive structures in accordance with some embodiments of the present invention.

The method 100 starts at 102 by preparing a branched polymeric additive. FIG. 2 depicts examples of branched polymeric additive structures suitable for use in the present inventive method, such as T-shaped 200, H-shaped 202, pompom-shaped 204, barbwire-shaped (flexible main chain with rigid side chains) 206, star-shaped 208, comb-shaped 210, dumbbell-shaped 212 or a hybrid shaped 214.

In some embodiments, the branched polymeric additive is prepared by bonding a linear polymer with a core molecule in the presence of a catalyst. In some embodiments, the linear polymer is at least one of a mono-vinyl-terminated polydimethylsiloxane, a polybutadiene, a fluorelastomer, or a perfluoroelastomer. In some embodiments, the core molecule, which can be a single molecule or a combination or multiple molecules, for example, as in a polymer, is at least one of tetrakis(dimethylsiloxy)silane, pentaerythritol tetrakis(3-mercaptopropionate), 1,3,5-triallyl-1,3,5-triazine-2,4,6(1H,3H,5H), divinyl terminated polydimethylsiloxane, 1,2-bis(trichlorosilyl)ethane, 1,2-bis(methyldichlorosilyl) ethane, methyldichlorosilane, or allyldichlorosilane. In some embodiments, the catalyst is at least one of a platinum catalyst, azobisisobutyronitrile, triethylamine or 1,5,7-triazabicyclo(4.4.0)dec-5-ene.

Figure 3:
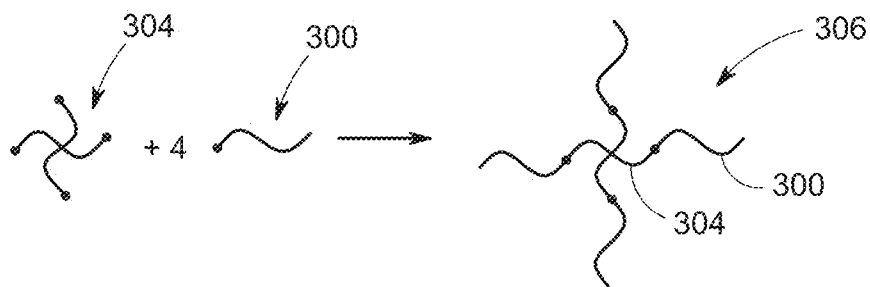
FIG. 3 depicts a schematic representation of the reaction mechanism to form a star-shaped, branched polymeric additive in accordance with some embodiments of the present invention.
Figure 4A:
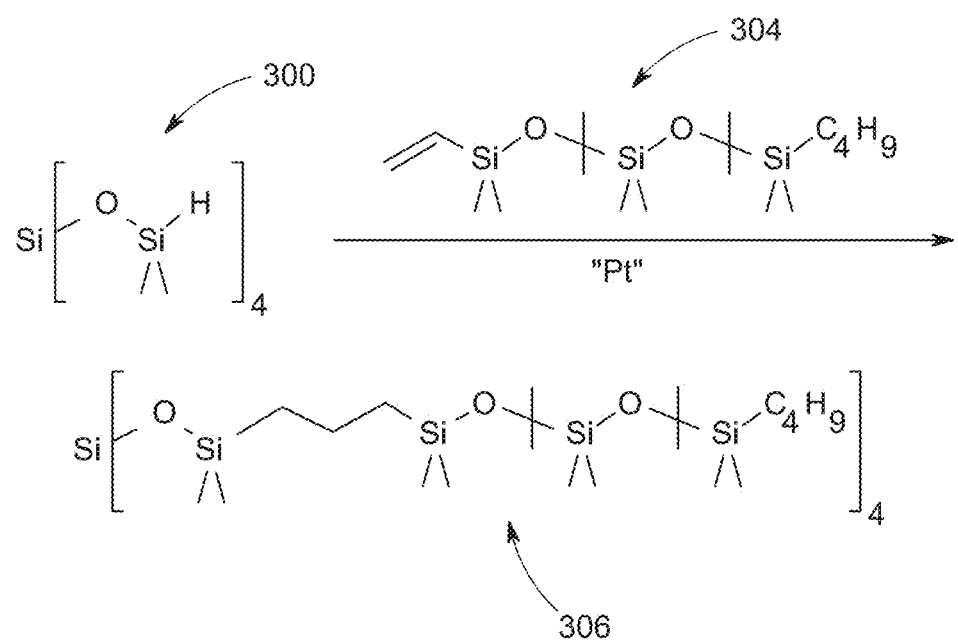
FIG. 4A depicts the synthetic scheme for forming a branched polymeric additive in accordance with some embodiments of the present invention.
Figure 4B:
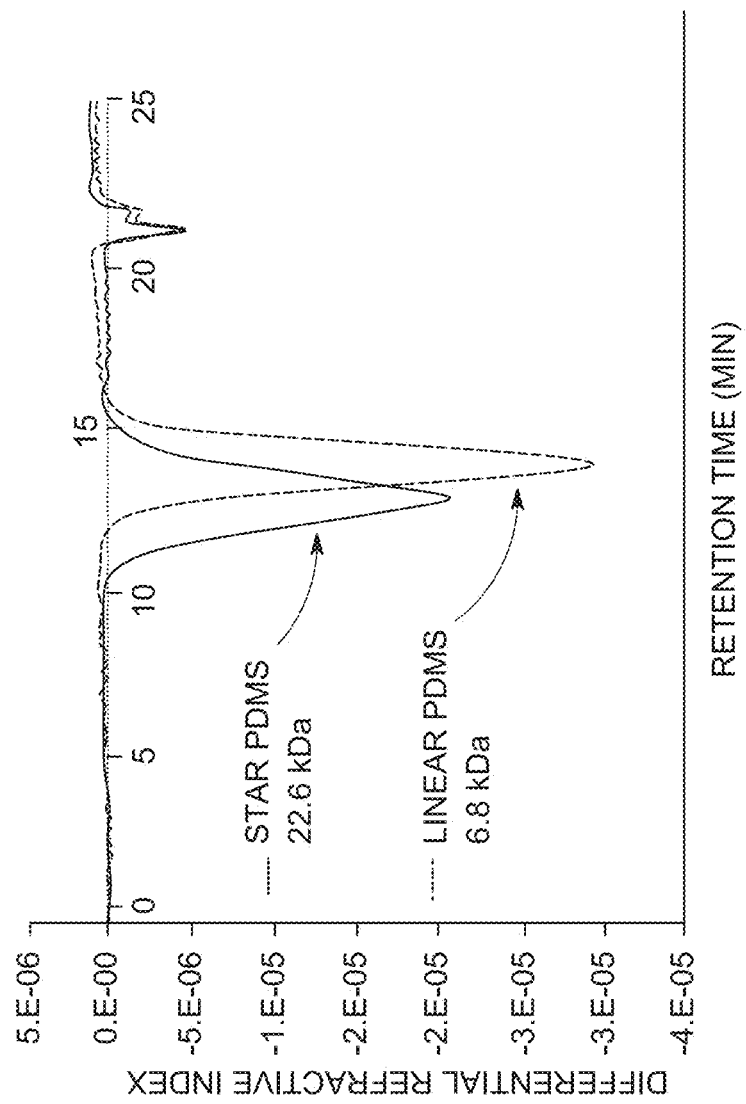
FIG. 4B depicts a graphical characterization by size exclusion chromatography of a branched polymeric additive in accordance with some embodiments of the present invention.

FIG. 3 depicts a schematic representation of the reaction mechanism to form a star shaped 208 branched polymeric additive in accordance with some embodiments of the present invention. In one embodiment, a star shaped branched polymeric additive 306 is synthesized by a hydrosilylation between a linear polymer 300, such as vinyl-terminated polydimethylsiloxane (PDMS) and a core molecule, such as a tetra-functional silane molecule 304, such as tetrakis(dimethylsiloxy)silane, in the presence of a platinum catalyst, such as platinum-cyclovinylmethylsiloxane. While the above example describes the formation of a specific branched polymeric additive, varying the combination of the core molecule, linear polymer, and catalyst will result in the formation of different branched polymeric additive structures suitable for use in the present inventive method, including for example the branched polymeric additive structures depicted in FIG. 2. FIG. 4A depicts the synthetic scheme for the platinum catalyzed hydrosilylation reaction described above. As depicted in FIG. 4B, the platinum catalyzed hydrosilylation reaction is characterized by size exclusion chromatography (SEC) which suggests nearly complete attachment of the monovinyl-terminated PDMS to the tetra-functional silane 304.

Next, at 104, the branched polymeric additive is mixed with a polymer to form a polymeric mixture, wherein the branched polymeric molecule bonds with the polymer to reduce mobility in the polymer. At 106, the polymeric mixture is cured.

In some embodiments, the polymer comprises a polymer network physically cross-linked by, for example, hydrogen bonding, metal coordination cross-linking, ionic interactions, or physical associations. Physically associated networks include block co-polymers, polymer blends, thermoplastic elastomers, or other phase separating systems. In some embodiments, the polymer comprises a polymer network chemically cross-linked by covalent bonds between polymers.

The incorporation of branched polymeric structures into a polymer network can be accomplished as an additive separate from the polymer network or directly into the polymer network backbone. While synthetically more complex, incorporation of the branched polymeric structures into the polymer network backbone will eliminate the potential for phase separation of a branched polymeric additive separate from the polymer network structure. However, the low mobility of the branched polymeric additives will make incorporation into the backbone necessary for only specific material needs. Examples of specific material needs include extended lifetime requirements, narrow tolerance in the performance requirements over long lifetimes, and materials with interfaces that are sensitive to small quantities of contamination.

The incorporation of branched polymeric additives will advantageously enhance the strength, toughness, and/or produce a strain dependent response regardless of the modulus of the material ranging from conformal soft polymers and polymer gels or biomaterials to structural resins. In particular, this invention will address the prohibitively low fracture toughness of soft polymeric materials that has prevented their widespread implementation into a variety of practical applications. Examples of suitable polymers are low modulus network and elastomers, such as polydimethylsiloxane, or poly(styrene-b-ethylene-co-butylene-b-styrene), or poly (styrene-b-isoprene-b-styrene), or poly(styrene-b-butadiene-b-styrene), or polybutadiene networks, or natural rubber, or poly(propylene oxide) networks; solvent-swollen polymer gels, such as polybutadiene networks swollen with dibutyl pthalate, or polypropylene glycol network swollen with dibutyl phthalate, or silicone networks swollen with non-reactive silicone; polymer networks or gel containing unreacted polymer precursors, such as silicone networks, or polybutadiene networks, or poly(propylene glycol); or biomaterials, such as polypeptide gels, or poly(hydroxyethyl methactylate)(HEMA), or hyaluronic acid-based hydrogels, or poly(N-isopropylacrylamide)-based hydrogels.

Enhancing the toughness of soft materials will facilitate implementation into a wide variety of applications including robotics, prosthetics, damping, biotissue simulants, tissue regeneration, biomedical implants, coatings, and sensors. In addition, tailoring the strain-dependent mechanical response will allow for the polymer material to remain soft and conformable at low strain rates but stiffen upon high deformation rates. This strain-dependent mechanical response can be utilized in wearable textiles, prosthetics, and coatings and provide materials with enhanced blast, shock, and fracture protection. Incorporation of branched additives in rigid structural polymers will further enhance their fracture toughness leading to implementation into additional applications and the reduction of size and weight.

Enhancements from incorporating branched polymeric additives into a polymer network are the result of the additive architecture, requiring no specific interactions, and can be utilized in any polymer network. This allows for a single branched polymeric additive to be utilized with a variety of network chemistries with similar solubilities. As a result, the branched polymeric additive production can be increased in scale to reduce the end cost of the product. While no specific interactions are required to obtain the aforementioned improvements, chemical functionalities that promote interaction of the branched polymeric additive with the polymer network can provide further enhancements. Examples of chemical functionalities that promote interaction include hydrogen bond donors/acceptors, metal center ligands, and the production of covalent bonds.

In one embodiment of forming a toughened polymeric material, 25 grams of vinyl-terminated PDMS and 25 grams of either the branched PDMS additive described above or a linear PDMS (1,100 g/mol) were mixed with 800 ppm of a platinum-cyclovinylmethylsiloxane complex by mechanical mixing for 15 minutes. A tetrafunctional silane cross-linker, tetrakis(dimethylsiloxy)silane, was added at 4.0 molar equivalents of hydride to vinyl functionality and stirred for an additional 10 minutes. The samples were degassed by vacuum and cured for 72 hours at 82° Celsius. In most samples the modulus did not appreciably change after 24 hours, indicating complete cure.

Figure 5:
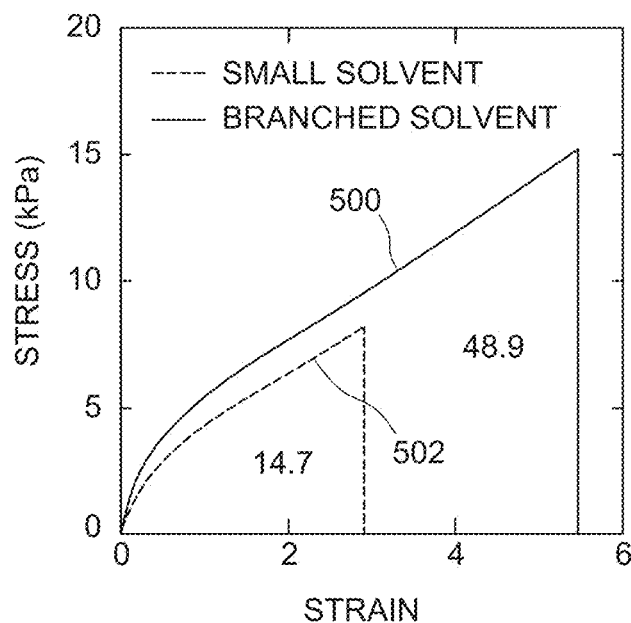
FIG. 5 depicts the stress-strain behavior for a toughened polymeric material in accordance with some embodiments of the present invention.

Tensile testing on the samples was performed using an MTS Synergie load frame at 10 in/minute and a 500 N load cell on gel samples in a dogbone geometry. FIG. 5 shows the stress-strain behavior of gel samples containing 50% of the star-branched additive 500 and 50% of a small molecular weight linear chain (1,100 g/mol) 502. The stress-strain tensile data exhibited a two-fold enhancement of the strength (stress at break) and a three-fold enhancement in toughness (integral of stress-strain curve) with the star-branched additive 500 relative to the small linear chain solvent 502. This is believed to be the result of a combination of mixing of the star shaped molecule with the polymer and bonding to the polymer network where trace levels of unreacted functional groups react with the polymer network to form star-shaped dangling chain ends.

Figure 6:
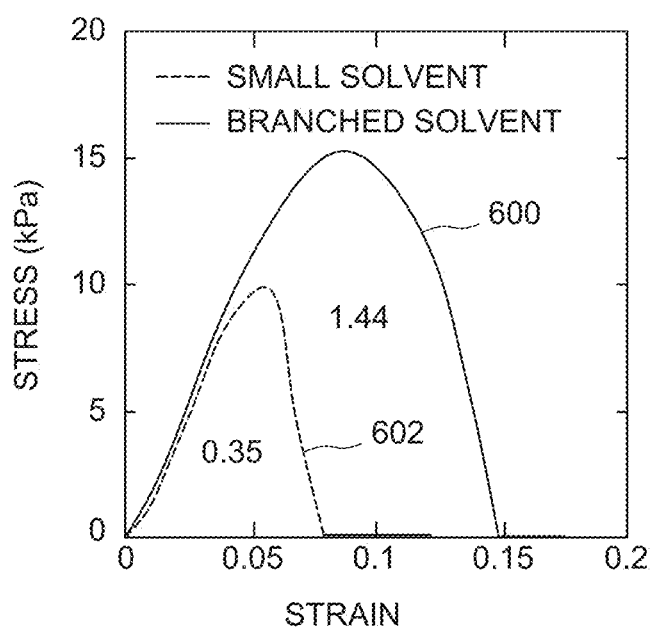
FIG. 6 depicts stress-strain tack adhesion data for a toughened polymeric material in accordance with some embodiments of the present invention.

Tack adhesion testing was performed on an Anton Paar rheometer using a tack probe with a circular cross-section 8 mm in diameter. The tack probe was brought into contact with the gel sample under a force of 1.5 N for 120 seconds followed by drawing the tack probe away from the sample at a rate of 1 mm/s. FIG. 6 shows the comparison of the stress-strain tack adhesion data for PDMS gels with either 50 volume % of the star-branched additive 600 or 50 volume % of a small molecule PDMS additive (1,100 g/mol) 602. The results were similar to the tensile data where the ultimate force was significantly larger and the work of adhesion (toughness) exhibited a three-fold increase relative to the small linear additive. This is believed to be the result of a combination of mixing of the star shaped molecule with the polymer and bonding to the polymer network where trace levels of unreacted functional groups react with the polymer network to form star-shaped dangling chain ends.

EXAMPLES

Example: Synthesis and Incorporation of Branched Solvent

Materials

All materials were obtained through Gelest Inc. (Morristown, Pa., USA) and were used as-received.

Branched Additive Synthesis

Monovinyl-terminated PDMS (Mn=6100 Da) (74.23 g, 12.17 mmol), tetrakis(diethylsiloxy)silane (1.0 g, 3.042 mmol) and platinum-cyclovinylmethylsiloxane (58.2 µL) were combined in a 250 mL round bottom flask fitted with a stirrer bearing and mechanical stirring shaft. The reaction mixture was stirred at 90° C. in a temperature controlled oil bath for 3 days. The molecular weight by size exclusion chromatography (SEC) did not appreciably change after 24 hours.

The branched structure was synthesized by attaching monovinyl-terminated PDMS to a central core Scheme 1 illustrated in FIG. 3. The reaction consisted of a hydrosilylation between a vinyl-terminated PDMS linear polymer and a tetra-functional silane molecule (tetrakis(dimethylsiloxy) silane) in the presence of a platinum catalyst as illustrated in FIG. 4A. The reaction was characterized by SEC which suggests nearly complete attachment of the monovinyl-terminated PDMS to the tetra-functional silane, see FIG. 4B. FIG. 4B illustrates the SEC analysis of reaction showing shift of star polymer to higher molecular weight relative to linear peak with uniform peak shape and nearly 4-fold increase in molecular weight (right). The reaction was scaled up to ~50 g for incorporation into polymer gels.

Gel Processing 25 g vinyl-terminated PDMS (v-PDMS) and 25 g of either the branched PDMS additive or a linear PDMS (1,100 g/mol) were mixed with 800 ppm of a platinum-cyclovinyl-methylsiloxane complex by mechanical mixing for 15 min. A tetrafunctional silane cross-linker, tetrakis(dimethylsilox-y)silane, was added at 4.0 molar equivalents of hydride to vinyl functionality and stirred for an additional 10 min. The samples were degassed by vacuum and cured for 72 h at 82° C. In most samples the modulus did not appreciably change after 24 h, indicating complete cure.

Tensile Testing

Tensile testing was performed using an MTS Synergie load frame at 10 in/min and a 500 N load cell on gel samples in a dogbone geometry. FIG. 5 shows the stress-strain behavior of gel samples containing 50% of the star-branched additive and 50% of a small molecular weight linear chain (1,100 g/mol). The stress-strain tensile data exhibited a two-fold enhancement of the strength (stress at break) and a three-fold enhancement in toughness (integral of stress-strain curve) with the star-shaped additive relative to the small linear solvent.

Tack Adhesion Testing

Tack adhesion testing was performed on an Anton Paar rheometer using a tack probe with a circular cross-section 8 mm in diameter. The tack probe was brought into contact with the gel sample under a force of 1.5 N for 120 sec followed by drawing the tack probe away from the sample at a rate of 1 mm/s. The results were similar to the tensile data where the ultimate force was significantly larger and the work of adhesion (toughness) exhibited a three-fold increase relative to the small linear additive. FIG. 6 illustrates the comparison of the stress-strain tack adhesion data for PDMS gels with either 50 vol % of the star-branched additive or 50 vol % of a small molecule PDMS additive (1,100 g/mol). Similar to the tensile testing, the adhesive strength (maximum stress) and toughness/work of adhesion (integral of the stress-strain curve) are significantly improved for the gel containing the star-branched solvent when compared to a sample containing the small molecule additive.

Example 3: Synthesis and Incorporation of Branched Solvent

As shown in the preceding examples, the mechanical properties of polymeric networks can be significantly modified through the incorporation of additives with topological constraints and/or entanglements. To identify the most promising of the substantial number of potential additives we are developing computational models. Direct atomistic modeling of the mechanical response of these systems is still unobtainable because of the slow dynamics and limited size of atomistic models. Coarse-graining models are being utilized to bridge this vast temporal and spatial scale. Conventional coarse graining methods may utilize soft-repulsive interaction potentials between particles made of a large number of polymer monomers. Although the soft potential has substantial benefits allowing for long-time simulations, it also leads to unphysical crossing of the polymer chains making simulation of mechanical properties unrealistic. We addressed this issue by introducing a repulsive potential between bonds that prevents unphysical chain crossing. The models of polymer gel incorporating polymer network and a solvent composed of polymers exhibiting various shapes and lengths were built by applying recent ARL-developed coarse-graining strategy. We have applied several coarse-grain techniques using both hard- and soft-repulsive potentials. In the latter care, a newly developed bond potential was also implemented. The polymer models were subjected to Molecular Dynamics simulations using LAMMPS program and the stress-strain relations were calculated with varying strain-rates, see FIG. 7. A fracture model of polymer networks, dependent on the network deformation, was introduced and applied to study toughness of polymeric gels. The computational modeling supports the observed improvements through the addition of branched and entangled solvent. In addition, the computational modeling suggests the most significant benefit from a "molecular barbed-wire" architecture where an entangled linear polymer has several short rigid side-chains resulting in a dramatic reduction in solvent mobility.

Proposed Methods for Obtaining Additional Identified Structures

Example A: Molecular Barbed Wire Synthesis—Polybutadiene Flexible Main Chain (Covalent Reaction in the Absence of a Catalyst)

Monoamino-terminated polystyrene can be synthesized using the methods of Hegewald et al[1] or Pourjavadi et al[2] using the so-called "initiator method" and selective deprotection strategies during atom transfer radical polymerization (ATRP). The resulting amino-terminated polystyrene can then be mixed with commercially available maleic anhydride-functionalized polybutadiene (Cray Valley, Exton, Pa., USA) in tetrahydrofuran, a good solvent for both polymers. Upon mixing, the amine and maleic anhydride functionalities will spontaneously react[3] to form a molecular barb wire structure composed of a long polybutadiene chain with several shorter polystyrene chains attached at various points. The length of the polystyrene chains can be controlled by the ATRP monomer to initiator ratio and the maleic anhydride functionalized polybutadiene is available in multiple functional densities allowing for control over the rigid chain length and density. The same strategy can be utilized with commercially available hydroxyl-terminated polystyrene (e.g. Polymer Source, Montreal, Quebec, Canada; American Custom Chemicals Corporation, San Diego, Calif., USA, etc.) that will also react with the maleic anhydride functionalities on the polybutadiene chain. This same general scheme can be utilized with other commercially available end-functionalized rigid polymers including hydroxyl-terminated polycarbonates, poly methacrylates, polyphenylenes, poly(vinyl pyridine)s, polythiophenes, or poly(vinyl pyrolidone)s and amine functional polymethacrylates, poly(vinyl pyridine)s, or polycarbonates.

Example B: Enhanced Solubility Barbed Wire Synthesis—Polybutadiene Flexible Main Chain (Polymerization of a Secondary Chain from the Rigid Chain)

One potential challenge associated with "molecular barbed wire" solvent is that incorporation of rigid pendant chains with chemistry different than the flexible backbone may lead to phase separation. A solution to this problem is to cap the rigid pendant groups with an end chemistry that enhances the solvent solubility in the resin matrix. Producing the mono-amine-terminated polystyrene by ATRP provides the opportunity for the opposite end to maintain a halide functionality (examples include chlorine- and bromine-functionalization). These end groups remain active after reaction between the amine of the polystyrene and the maleic anhydride of the polybutadiene. As a result, that halide functionality can be used to initiate ATRP of a second polymer after the polystyrene chains are attached to the polybutadiene.

Example C: Enhanced Solubility Barbed Wire Synthesis—Polybutadiene Flexible Main Chain (Bonding of a Rigid/Soft Copolymer)

Similar to Example B, the halide functionality present on the end opposite the amine could be used to initiate polymerization of a second polymer by ATRP prior to reaction with the polybutadiene resulting in a mono-amino-terminated copolymer. The amino-terminated copolymer could subsequently be coupled to the maleic anhydride functionalized polybutadiene.

Example D: Enhanced Solubility Barbed Wire Synthesis—Polybutadiene Flexible Main Chain (Covalent Reaction in the absence of a catalyst)

Similar to example B, the maintained halide functionality after attachment of the polystyrene chains to the polybutadiene could be reacted with a thiol-terminated polymer to provide covalent attachment in the absence of a catalyst. Thiol-terminated polymer chains can readily be produced using a reversible addition-fragmentation chain-transfer (RAFT) polymerization. A similar method could be utilized with commercially available thiol-terminated polystyrenes, polyacrylates, poly(vinyl pyridine)s, or poly(vinyl pyrrolidone)s.

Example E: Molecular Barbed Wire Synthesis—Polybutadiene Flexible Main Chain (Covalent Reaction in the Absence of a Catalyst)

Reversible Addition-Fragmentation Chain-Transfer (RAFT) polymerization has been demonstrated for a variety of polymers including styrene,[4] acrylates and methacrylates.[5] After RAFT polymerization, the polymer chains are often end-functionalized with a thiol. The thiol functionality enables covalent coupling with a maleic anhydride group or double bonds (e.g. polymers like isoprene and butadiene) without the need for an added catalyst. A similar method could be utilized with commercially available thiol-terminated polystyrenes, polyacrylates, poly(vinyl pyridine)s, or poly(vinyl pyrrolidone)s.

Example F: Molecular Barbed Wire Synthesis—Polydimethylsiloxane (PDMS) Flexible Main Chain (Covalent Reaction in the Absence of Catalyst)

Polydimethylsiloxane is commercially available with reactive chemical functionalities randomly distributed along the backbone in varying functional densities. The available chemistries include vinyl, amino, and thiol/mercapto groups. Vinyl and thiol groups can provide thiol-ene reaction sites with thiol groups and alkenes, respectively. The amino groups provide a site for reaction with epoxy- or maleic anhydride functionalized chains. None of these reactions requires a catalyst to proceed. A similar method could be utilized with commercially available thiol-terminated polystyrenes, polyacrylates, poly(vinyl pyridine)s, or poly(vinyl pyrrolidone)s and vinyl-terminated polystyrene, polyacrylates, and polythiophenes.

Example G: Molecular Barbed Wire Synthesis—Polydimethylsiloxane (PDMS) Flexible Main Chain (Polymerization Originating from the Flexible Main Chain)

Polydimethylsiloxane is commercially available with chloromethylphenethyl groups distributed along the polymer backbone. The halide functionalization provides an initiation site for ATRP and RAFT polymerization to grow well controlled polymer chains from the backbone.

Example H: Enhanced Solubility Molecular Barbed Wire Synthesis—Polydimethylsiloxane (PDMS) Flexible Main Chain (Polymerization Originating from the Flexible Main Chain)

An extension of Example G is to use the reactive end group after growth of the rigid polymer chain to synthesize a second polymer chain.

Example I: Enhanced Solubility Molecular Barbed Wire Synthesis—Polydimethylsiloxane (PDMS) Flexible Main Chain (Bonding of a Rigid/Soft Copolymer)

Similar to example F, a copolymer can be synthesize using RAFT polymerization to produce a thiol-functional group at the end of the rigid polymer section. The thiol group could then be used to bind the copolymer to a vinyl-functionalized PDMS chain.

Example J: Molecular Barbed Wire Synthesis—Graft Polymerization of poly(acrylic acid) from the Polybutadiene Block of a poly(styrene-b-butadiene-b-styrene) Copolymer Materials
Poly(styrene-b-butadiene-b-styrene)(SBS) (8508; Vector Polymers, Houston, Tex., US), tetrahydrofuran (Aldrich), and Azobisisobutyronitrile (AIBN) (Aldrich) were all used as-received. Acrylic acid monomer (Aldrich) was passed through an inhibitor removal column prior to use.
Synthesis
6 g of SBS, 20 g of acrylic acid, and 0.4 g AIBN were weighed into a 500 ml flask along with 250 ml of THF. The head space was purged with nitrogen for 30 min followed by heating the solution under reflux conditions for 24 hrs under a nitrogen flow. The solution was rotovapped to concentrate the solution down to 100 mL. The polymer is then precipitated into Methanol. The precipitate is collected and dried in a vacuum oven at 40 C. The acrylic acid molecular weight can be controlled using the ratio of AIBN and acrylic acid in the initial solution.
NMR Analysis
Using the constant polystyrene signal above 6 ppm in the NMR spectra we were able to obtain quantitative information on the amount of grafted acrylic acid. This initial data demonstrates that polyacrylic acid has been incorporated onto the polybutadiene chain but requires further characterization to determine the length of the individual chains.

Example K: Molecular Barbed Wire Synthesis—RAFT polymerization of poly(tert-butyl acrylate) that can be Bonded to the Polybutadiene Block of a poly(styrene-b-butadiene-b-styrene) Copolymer Materials Dodecane thiol, acetone, sodium hydroxide, carbon disulfide, 2-bromo-propionic acid, 10% HCl, Magnesium Sulfate and Hexanes were used as-received from Aldrich. Poly(styrene-b-butadiene-b-styrene)(SBS) (8508; Vector Polymers, Houston, Tex., US). Tert-butyl acrylate monomer (Aldrich) was passed through an inhibitor removal column prior to use.

RAFT Chain Transfer Agent Synthesis 3.2 g of sodium hydroxide are dissolved into 30 mL of water along with 300 mL of acetone and 14.78 g of dodecane thiol. The solution is placed in an ice bath for 20 min to obtain thermal equilibrium. Slowly add 7.56 mL of carbon disulfide dropwise over 10 min. Stir for 20 min. Add 8.6 mL of 2-bromo-propionic acid and stir overnight. After reaction completion, add 350 mL of 10% hydrochloric acid and stir for 15-20 min to obtain a yellow precipitate. Filter the precipitate and wash with distilled water. Dissolve the washed precipitate in ethyl acetate and stir with magnesium sulfate to remove water and filter out magnesium sulfate. Recrystallize from hexanes to obtain the desired product.

Synthesis of tert-butyl acrylate Chains 2 g of tert-butyl acrylate, 0.219 g of the synthesized RAFT chain transfer agent, and 0.010 g azobisisobutyronitrile (AIBN) were mixed in 10 mL of tetrahydrofuran (THF). The solution was purged with nitrogen for 15 min followed by reflux for 3 h. The reaction solution was placed under vacuum to remove the tetrahydrofuran. The solid product was dissolved in 5 mL ethanol and precipitated in distilled water. The precipitate was then dried overnight at 40 deg C. under vacuum.

Cleavage of RAFT Chain Transfer Agent to Obtain thiol-functionalized poly(tert-butyl acrylate)

5 g of poly(tert-butyl acrylate) dissolved in 50 mL of methanol and 2.5 g of sodium borohydride were added dropwise over 10 min. The solution was purged with nitrogen for 20 min and stirred overnight. The solution was concentrated under vacuum to 10 mL and then precipitated into distilled water. The precipitate was filtered, washed with 10 hydrochloric acid, followed by washing with water, before drying the product at 40 deg C. under vacuum overnight.

Grafting of thiol-functionalized poly(tert-butyl acrylate) onto the Butadiene Portion of the Copolymer 0.5 g poly(styrene-b-butadiene-b-styrene), 2.365 g thiol-functionalized poly(tert-butyl acrylate), and 0.001 g AIBN were dissolved in 50 mL of THF. The solution was purged with nitrogen for 20 min before increasing the temperature to reflux for 24 h under a nitrogen flow. The solution was concentration under vacuum, precipitated in methanol, filtered, and dried at 40 deg C. under vacuum overnight.

NMR Analysis

Comparison of the NMR spectra of the final product to that of the initial SBS demonstrates a significant increase in peak area around 1.5 and 2.2 ppm. These increased peaks intensities are consistent with the grafting of poly(tert-butyl acrylate). FIG. 9 provides NMR spectra of SBS and the poly(tert-butyl acrylate) grafted SBS demonstrating changes to the NMR spectra supporting grafting of the poly(tert-butyl acrylate) on the polybutadiene portion of SBS.

REFERENCES

1 Hegewald, J., Pionteck, J., Häußler, L., Komber, H. & Voit, B. End-functionalized polystyrene by ATRP: A facile approach to primary amino and carboxylic acid terminal groups. *Journal of Polymer Science Part A: Polymer Chemistry* 47, 3845-3859, doi:10.1002/pola.23451 (2009).

2 Pourjavadi, A. et al. Use of a novel initiator for synthesis of amino-end functionalized polystyrene (NH2-PS) by atom transfer radical polymerization. *J Polym Res* 19, 1-8, doi:10.1007/s10965-011-9752-x (2011).

3 Hu, G. H. & Lindt, J. T. Amidification of poly(styrene-co-maleic anhydride) with amines in tetrahydrofuran solution: A kinetic study. *Polymer Bulletin* 29, 357-363, doi:10.1007/bf00944831 (1992).

4 Babu, R. P. & Dhamodharan, R. Reversible addition-fragmentation chain transfer RAFT polymerization of styrene using novel heterocycle-containing chain transfer agents. *Polymer International* 57, 365-371 (2008).

5 Moad, G. et al. Living free radical polymerization with reversible addition—fragmentation chain transfer (the life of RAFT). *Polymer International* 49, 993-1001, doi: 10.1002/1097-0126(200009)49:9<993::aid-pi506>3.0.co;2-6 (2000).

Other advantages, benefits and details of the present invention are described in Army Research Laboratory Technical Report ARL-TR-6338 titled "Branched Polymers for Enhancing Polymer Gel Strength and Toughness (Final Report)" by Robert H. Lambeth et al. February 2013 which is hereby incorporated by reference herein. While the foregoing is directed to embodiments of the present invention, other and further embodiments of the invention may be devised without departing from the basic scope thereof.

The invention claimed is:

1. A toughened polymeric material, comprising:
a polymer network; and
a branched polymeric molecule bonded to the polymer network
wherein the branched polymeric additive comprises a linear polymer bonded to a core molecule and
wherein the core molecule is at least one of tetrakis (dimethylsiloxy)silane, or pentaerythritol tetrakis(3-mercaptopropionate), or 1,3,5-triallyl-1,3,5-triazine-2, 4,6(1H,3H, 5H), divinyl terminated polydimethylsiloxane or 1,2-bis(trichlorosilyl)ethane, or 1,2-bis(methyldichlorosilyl)ethane, or methyldichlorosilane or allydichlorosilane.

2. The toughened polymeric material of claim 1, wherein the polymer network is at least one of physically cross-linked or chemically cross-linked.

3. The toughened polymeric material of claim 1, wherein the branched polymeric additive has a non-linear structure and the non-linear structure of the branched polymeric additive is at least one of T-shaped, H-shaped, pompom-shaped, barbwire-shaped, star-shaped or comb-shaped.

4. The toughened polymeric material of claim 1, wherein the linear polymer is at least one of a mono vinyl-terminated polydimethylsiloxane, or a polybutadiene, or a fluoroelastomer, or a perfluoroelastomer, or a poly(styrene-b-ethylene-co-butylene-b-styrene, or a poly(styrene-b-isoprene-b-polystyrene), or a poly(styrene-b-butadiene-b-polystyrene), or a natural rubber, or a chloroprene, or a butyl rubber, or a nitrile rubber, or a fluorosilicone rubber, or a polymer or copolymer of poly(propylene oxide).

5. A toughened polymeric material of claim 1 wherein the polymer network is at least one of an elastomer, or polydimethylsiloxane, or polybutadiene, or a fluoroelastomer, or a perfluorelastomer, or poly(styrene-b-ethylene-co-butylene-b-styrene, or poly(styrene-b-isoprene-b-polystyrene), or poly(styrene-b-butadiene-b-polystyrene), or a natural rubber, or chloroprene, or a butyl rubber, or a nitrile rubber, or a fluorosilicone rubber, or poly(propylene oxide).

6. A toughened polymeric material of claim 1 wherein the polymeric mixture is cured to form a toughened, soft polymeric gel material having a storage modulus G' less than 1 MPa wherein the branched polymeric molecule reduces mobility in the polymer material by increasing physical chain entanglements.

7. A toughened polymeric material of claim 1 wherein the polymer network is a polymer gel network and the inclusion of the branched polymeric additive in the polymer gel network reduces the mobility of the additive in the soft polymeric gel material increasing at least one of the modulus, the strength, the adhesive strength, the toughness and the fracture toughness of the toughened, soft polymeric gel material.

8. A toughened polymeric material of claim 1 wherein the branched polymeric additive is at least one of T-shaped, H-shaped, pompom-shaped, barbwire-shaped, star-shaped, or comb-shaped, or a hybrid thereof.

9. A toughened polymeric material of claim 1 wherein the linear polymer is at least one of a vinyl-terminated polydimethylsiloxane, or a polybutadiene, or a fluorelastomer, or a perfluoroelastomer, or poly(styrene-b-ethylene-co-butylene-b-styrene, or poly(styrene-b-isoprene-b-polystyrene), or poly(styrene-b-butadiene-b-polystyrene), or a natural rubber, or a chloroprene, or a butyl rubber, or a nitrile rubber, or a fluorosilicone rubber, or a polymer of poly(propylene oxide).

10. A toughened polymeric material of claim 1 wherein the polymer network comprises at least one of a physically cross-linked network or a chemically cross-linked network.

11. A toughened polymeric material of claim 1 wherein the inclusion of the branched polymeric additive in the polymer network increases the modulus, the strength, the toughness or the fracture toughness of the toughened polymeric material by either (1) the additive acting as additional chemical cross-linking requiring a larger number of covalent bonds to be broken to facilitate further fracture propagation; (2) the additive resisting migration away from the crack tip producing a larger zone of plastic deformation requiring additional energy to maintain crack propagation; or (3) increasing the plastic deformation zone producing greater energy dissipation to limit crack propagation.

12. A toughened polymeric material, comprising:
a polymer network; and
a branched polymeric molecule bonded to the polymer network
wherein the branched polymeric additive further comprises rigid oligomer or polymer chains bonded to a flexible polymer chain.

* * * * *